(12) United States Patent
Grigoriadis et al.

(10) Patent No.: US 7,721,201 B2
(45) Date of Patent: *May 18, 2010

(54) AUTOMATIC AUTHORING AND PUBLISHING SYSTEM

(75) Inventors: Irene Grigoriadis, Malibu, CA (US); Victor A. Ramirez, North Hollywood, CA (US)

(73) Assignee: OmegaBlue, Inc., Santa Monica, CA (US)

( * ) Notice: Subject to any disclaimer, the term of this patent is extended or adjusted under 35 U.S.C. 154(b) by 618 days.

This patent is subject to a terminal disclaimer.

(21) Appl. No.: 11/677,461

(22) Filed: Feb. 21, 2007

(65) Prior Publication Data

US 2007/0136663 A1    Jun. 14, 2007

Related U.S. Application Data

(63) Continuation-in-part of application No. 11/553,437, filed on Oct. 26, 2006, which is a continuation-in-part of application No. 11/379,769, filed on Apr. 21, 2006.

(60) Provisional application No. 60/674,157, filed on Apr. 21, 2005.

(51) Int. Cl.
*G06F 17/00* (2006.01)

(52) U.S. Cl. ...................................... 715/243; 715/255

(58) Field of Classification Search ................. 715/243, 715/255
See application file for complete search history.

(56) References Cited

U.S. PATENT DOCUMENTS

| | | | |
|---|---|---|---|
| 5,133,051 A | 7/1992 | Handley | |
| 5,140,676 A | 8/1992 | Langelaan | |
| 5,146,404 A * | 9/1992 | Calloway et al. | ............... 705/1 |
| 5,228,121 A | 7/1993 | Fontaine et al. | |
| 5,890,177 A * | 3/1999 | Moody et al. | ............... 715/210 |
| 6,052,514 A | 4/2000 | Gill et al. | |
| 6,167,409 A | 12/2000 | DeRose et al. | |
| 6,233,592 B1 | 5/2001 | Schnelle et al. | |
| 6,343,302 B1 | 1/2002 | Graham | |
| 6,377,956 B1 * | 4/2002 | Hsu et al. | ................. 707/104.1 |

(Continued)

OTHER PUBLICATIONS

ProtoType Industries, Inc. Press Release Sep. 18, 2002.

(Continued)

*Primary Examiner*—Rachna S Desai
(74) *Attorney, Agent, or Firm*—Connolly Bove Lodge & Hutz LLP

(57) ABSTRACT

The invention relates to a system and method for automatically producing documents that incorporate one or more data elements. A guided/structured software environment is provided that assists users in creating manuals by defining the appropriate content for each manual in a document definition section, content rules and relationships, and tasks to be performed for each type of manual entry. Manual content is stored as data and data elements, rather than pages of sentences, to more efficiently generate, revise, and store the content of a manual. A storage database is provided for retrieving and storing predefined templates, documents, data elements and data to produce a final manual. Manuals are created by combining various data elements. A preview interface permits a user to quickly view what revisions will look like in a final document prior to actually publishing the manual. A published manual is compiled by assembling the stored data into document.

26 Claims, 14 Drawing Sheets

U.S. PATENT DOCUMENTS

| | | |
|---|---|---|
| 7,278,094 B1 | 10/2007 | Dreyer et al. |
| 7,337,399 B2 | 2/2008 | Jensen et al. |
| 2002/0046245 A1 | 4/2002 | Hillar et al. |
| 2002/0156816 A1* | 10/2002 | Kantrowitz et al. ......... 707/530 |
| 2003/0149935 A1 | 8/2003 | Takizawa et al. |
| 2003/0149940 A1 | 8/2003 | Fordyce et al. |
| 2004/0049742 A1* | 3/2004 | Yokoyama et al. .......... 715/530 |
| 2004/0243921 A1* | 12/2004 | Carr et al. ................... 715/500 |
| 2005/0022104 A1 | 1/2005 | Wrenholt et al. |
| 2005/0022118 A1 | 1/2005 | Wefers et al. |
| 2005/0050442 A1 | 3/2005 | Pope et al. |
| 2005/0204047 A1 | 9/2005 | Mitchell et al. |
| 2006/0010172 A1* | 1/2006 | Grigoriadis et al. ......... 707/200 |
| 2006/0155700 A1* | 7/2006 | Dejean et al. ................. 707/6 |
| 2006/0271603 A1 | 11/2006 | Mathias |

OTHER PUBLICATIONS

ProtoType Industries, Inc. Press Release Sep. 2, 2003.
ProtoType Industries, Inc. Web Page Feb. 4, 2005.
Office Action for U.S. Appl. No. 11/379,769 with Notice of References Cited, dated Jun. 23, 2008, total 12 pages.
Office Action for U.S. Appl. No. 11/379,769 with Notice of References Cited, dated Apr. 22, 2009, total 12 pages.
Office Action for parent U.S. Appl. No. 11/379,769 with Notice of References Cited, dated Sep. 15, 2009 total 14 pages.
Office Action for parent U.S. Appl. No. 11/553,437 with Notice of References Cited, dated Sep. 30, 2009 total 20 pages.

* cited by examiner

Instance Editing

Book Publishing

AUTOMATIC AUTHORING AND PUBLISHING SYSTEM

CLAIM OF PRIORITY UNDER 35 U.S.C. §120

The present Application for Patent is a continuation-in-part of U.S. patent application Ser. No. 11/553,437, entitled "Automatic Authoring and Publishing System", filed Oct. 26, 2006, which is a continuation-in-part of U.S. patent application Ser. No. 11/379,769, entitled "Automatic Authoring and Publishing System," filed Apr. 21, 2006, which claims the benefit of U.S. Provisional Patent Application No. 60/674, 157, entitled "Documentation Preparation System," filed Apr. 21, 2005.

FIELD

The present invention relates to authoring and publishing software tools. More particularly, at least one embodiment provides an assisted authoring and publishing software tool that guides users in authoring and publishing manuals with structured templates having defined content areas, electronic library (data pools) of permissible content, structured data storage, and synthetic text generation.

BACKGROUND

During a production process of aircraft and other complex equipment, alterations or modifications to the equipment must be reflected in the corresponding technical, maintenance, and/or end-user documentation or manuals. For instance, as the audio/video system in a commercial aircraft is upgraded or changed the corresponding manuals have to be modified according to industry rules or regulations. Since an aircraft fleet may include aircraft having different combinations of systems or upgrades, different sets of manuals or instructions are often needed to support all aircraft in the fleet. Maintaining and generating the various document revisions leads to a tedious, time consuming, and potentially error-prone process.

The commercial aviation industry has determined that exchange of technical publications in a digital format provides substantial benefits compared to the traditional mediums of paper and microfilm. The industry has chosen the Standard Generalized Mark-up Language (SGML) [ISO 8879:1986] to exchange technical data currently published in book form. Technical illustrations are exchanged using the Computer Graphics Metafile (CGM) [ISO/IEC 8632:1999] for vector data and/or the CCITT Group 4 compression standard for raster data.

Existing documentation techniques typically employ intricate versioning schemes, esoteric document "languages" and large amounts of storage to hold all the different permutations of the documentation. U.S. Pat. No. 6,377,956 discloses a process in which documents are manually altered or revised, while older document versions are added to an ever growing database of complete documents before finally assembling the final document. The older document versions are maintained with all associated graphics, text and diagrams related to each document. However, with this approach, the size of the database eventually becomes very large and, consequently, processing of the documents slows down. U.S. Pat. No. 6,377,956 also relies on manual, unassisted editing of existing documents that typically requires specialized knowledge of the subject matter by the author, editor and others reviewing the document. That is, the person editing such documents would need to have specific knowledge about the product and the product's history to be able to ascertain whether the associated graphics, text and diagrams in the documentation are correct. A quality assurance reviewer or editor familiar with the technology, steps, or processes described in the documentation would need to review the final document for reliability. An author or reviewer may be required to re-learn an entire area of knowledge to update older documents. In complex technical systems, the possibilities for errors are proportional to the amount of knowledge required by the authors and reviewers. The potential for error may result in safety violations or other dangerous situations. Further, the author-reviewer-rewrite cycle is time-consuming and inefficient.

U.S. Patent Publication 2005/0022118 describes using a template where all the required elements that form the output must be maintained in exactly the same location otherwise the template is unable to recreate the document accurately. This technique is rigid, inflexible, and in most cases requires the author to make the template out of a document description language as described in U.S. Pat. No. 6,377,956. This requires the author to have extra knowledge about the structural requirements of the book/manual and how the selected templates may affect the final output. For example, in the airline industry the Federal Aviation Administration (FAA) and the Federal Transit Administration (FTA) require documentation to meet specific standards. Authors constantly review the formatting requirements to comply with changing governmental regulations. Further, U.S. Patent Publication 2005/0022118 only allows the structure of the book to be shown, and does not preview the final product for the author to see the effect of any changes. Thus, the author has to wait until the content is published and then make alterations in a repetitive cycle until the document is satisfactory. Any changes made during the review process starts the cycle over again wasting time and delaying production of the documentation required.

Thus, for the reasons discussed above, prior art document production and storage techniques are inadequate to generate, structure, and store multiple altered versions of a document. Furthermore, the ability to check and track changes made is slow and cumbersome due to the number of document comparisons that must be made. Therefore, there is a need for a system and method that assist and guide authors in creating highly structured documents that are automatically assembled, formatted, and reproduced to accurately reflect all the elements of the system with minimal knowledge required of the author. A further need exists for a system and method for updating and maintaining such documents to reflect the specific elements actually used in the project.

SUMMARY

The present invention provides a publishing system that satisfies at least some of these needs. The system includes a method comprising the steps of:
  a) obtaining a document definition comprising (i) a plurality of predefined data elements arranged in a tree-like data structure, each predefined data element specifying a portion of the data that can or must be used to generate the digital document, and (ii) a document structure for the digital document;
  b) providing data for at least some of the predefined data elements using content specific selection menus;
  c) storing the provided data in a database; and d) generating the digital document by compiling at least some of the stored provided data according to the document structure, including by automatically synthesizing text.

The document definition can also include content for the eventual document to be generated, rules governing such content, and relationships between data elements.

The data provided can be text, graphics (such as images, charts, graphs and tables) and hyperlinks. Some of the predefined data elements can have effectivity, which is an attribute of a data element that identifies those particular structures, such as by part number, to which the data element is applicable. The content-specific selection menus can be dynamically generated.

The digital document can be published into a published document having a readable format. This can be effected by generating the digital document as an extensible markup language (XML) document, forwarding the XML document to a publishing engine such as extensible style sheet language transformation (XSLT), and outputting the XML document from the XSLT as the published document. The published document is typically in a format selected from the group consisting of HTML, STML and PDF formats.

While several of the examples described herein relate to product service or maintenance manuals, it should be understood that the various features of the present invention may be implemented in a wide array of document creation processes for various purposes, products, and/or systems. Exemplary of a published document is a listing of the tools required to repair the complex equipment to which the document definition and data relate.

Beneficial features of the system include the ability to preview the document to be published prior to the final publishing, as well as the ability to receive an Internet based change request to the published document, and effecting the requested change. Another beneficial feature of the system is the ability to provide revision markings automatically on published documents by comparing the document to be published against a previously archived document, all on the fly, while publishing. Another benefit is the ability to subject the published document to validation rules.

Hyperlink data can be a hyperlink to a section of the digital document, and where multiple digital documents are generated from the data in the data base, to a different digital document.

The system also includes a processing device coupled to an input interface and configured to perform steps (b), (c), and (d) of the method.

The system also includes a machine-readable medium, which when executed by the processor, causes the processor to perform the method.

Benefits of the present invention can be obtained in different fields across multiple industries, with all users of the published documents, from the producer to the end user, enjoying some of the benefits.

The present invention assists users in automatically generating content and publishing technical books, manuals, and/or documents for large-scale, complex products and services for building, maintaining, repairing, servicing, and/or retrofitting products (e.g., aircraft, automobiles, electronic appliances, etc.).

An advantage of the invention is manual content is stored as predefined data elements and corresponding data, rather than as sentences or paragraphs, to more efficiently generate, revise, and store the content of a book, manual, or document. That is, rather than storing content of a document as complete pages of text (e.g., sentences, paragraphs), tables, and/or graphics, the present invention stores the content as distinct data for the predefined data elements in a database, such as a relational database. This also allows different manuals to be prepared using some of the same data elements and data, thereby saving storage space. This approach to storage of content permits a single data element to be modified to propagate that modification to all other manuals referencing that data element.

Another feature of the system is an instant preview mode that permits an author to quickly view what edited content will look like in a final document prior to actually publishing the manual.

While several of the examples described herein relate to aircraft service or maintenance books or manuals, it should be understood that the various features of the present invention may be implemented in a wide array of document creation processes for various purposes, products, and/or systems besides aircraft.

The system allows for editing one or more of the predefined data elements. Also, the predefined data elements can be cross-referenced to one or more other documents.

The content-specific selection menus may be dynamically generated based on a defined content type of the document definition.

This method can be implemented on hardware, software, or a combination thereof.

DRAWINGS

These and other features of the present invention will be understood with reference to the following description, appended claims, and accompanying drawings where:

DESCRIPTION

Introduction and Definitions

Figure 1:
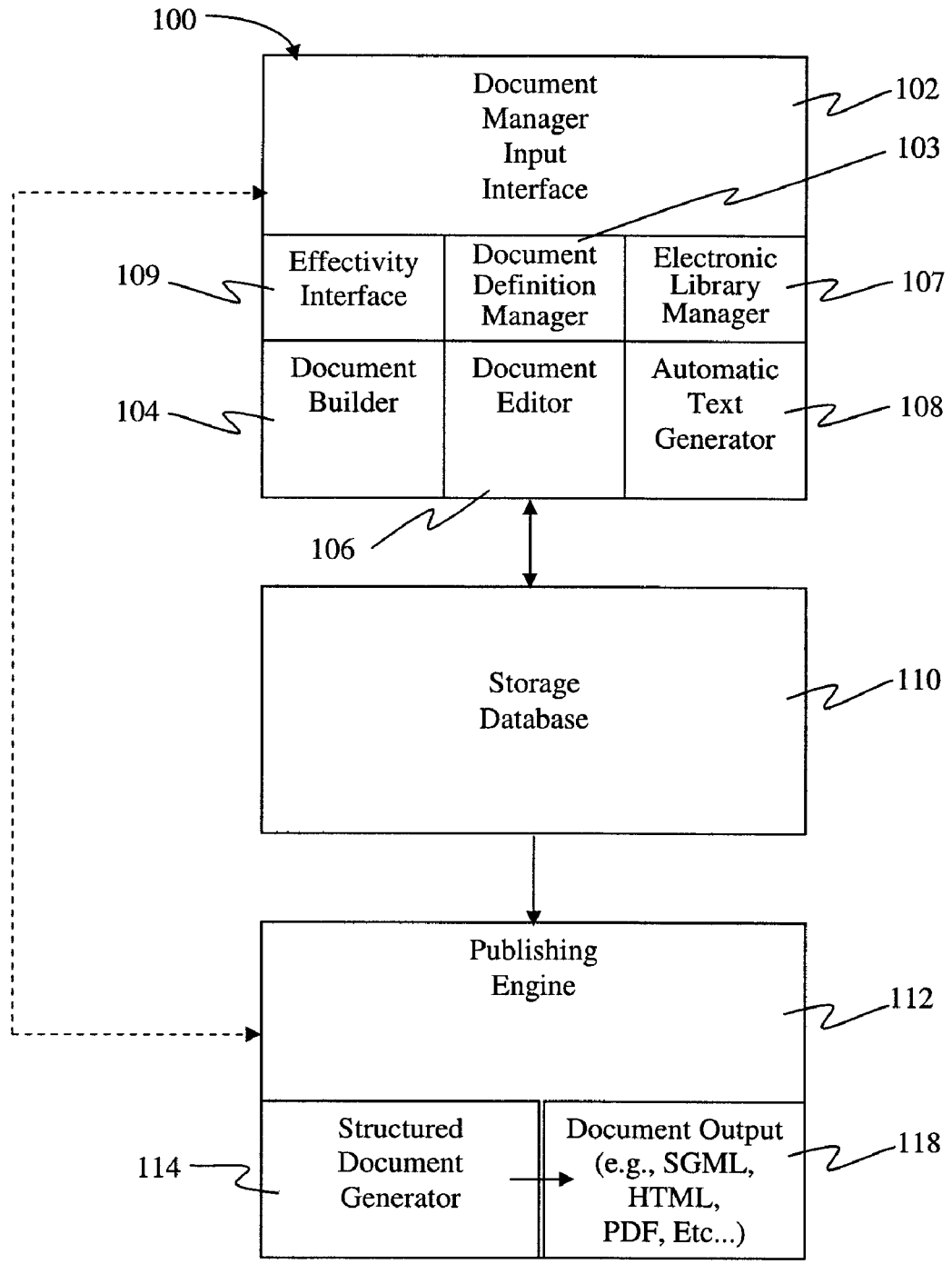
FIG. 1 is a block diagram illustrating an automatic authoring and publishing system according to one embodiment of the invention.

Methods and devices that implement various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure where the element first appears. The following description is provided to enable a person skilled in the art to make and use the invention and sets forth the best modes contemplated by the inventor, but does not limit the variations available.

In the following description, certain terminology is used to describe certain features of one or more embodiments of the invention.

"Document"—any writing that is readable including manuals, manuscripts, web pages, printable computer files, or other forms capable of being read. The documents that are produced in accordance with the present invention relate to complex equipment such as airplanes.

"Document definition"—a listing of the contents of a document including data elements to be contained in the document and the structure for the document.

"Data element"—defined attributes of the data to be used for producing a digital document such as whether the data is optional or requirement and the type of data.

"Document structure"—defined organization of a document such as title, chapters, tables, and styles.

"Digital Document"—electronically stored document that can be published in a desired format such as in PDF, HTML, and SGML formats.

"Data"—(i) text, (ii) quantities, (iii) graphics such as images and graphs and tables, and (iv) hyperlinks stored in a database.

"Document template"—data designated for use in multiple published documents, and optionally a style sheet defining the organization of a particular type of published document.

"Effectivity"—an optional attribute of a data element that identifies those particular structures of the equipment to which the data element is applicable. For example, if the data element is "removing ethernet switching unit" and the equipment is an airplane, the "effectivity" for that data element identifies those airplane structures that data element is applicable to. There may be many ethernet switching units in the airplane, but this particular data element is effective only for those identified in the effectivity attribute.

"Instance"—a particular version of a published document, which can be a manual, book, listing of parts, listing of tools, and the like.

"Storage medium"—any one or plurality of devices for storing data, including read-only memory (ROM), random access memory (RAM), magnetic disk storage mediums, optical storage mediums, flash memory devices and/or other machine readable mediums for storing information.

"Machine readable storage medium"—includes, but is not limited to portable or fixed storage devices, optical storage devices, and various other mediums capable of storing, containing or carrying instruction(s) and/or data.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Various embodiments provide a system, method and/or device for an automatic authoring and publishing system. One embodiment of the present invention assists users in automatically generating content and publishing technical manuals for large-scale, complex products and services for building, maintaining, servicing, and/or retrofitting aircraft.

One feature provides a guided or structured software environment that assists users in creating manuals or documents by defining the appropriate data structures and content for each manual section, content rules and relationships, and tasks to be performed for each type of manual entry. Predefined document definitions and data structures are used to facilitate the creation of data elements and compile a final document, such as a book and/or manual.

General System

A system according to this invention involves the steps of: A) obtaining a document definition comprising (i) a plurality of predefined data elements arranged in a tree-like data structure, each predefined data element specifying a portion of the data that can or must be used to generate the digital document, and (ii) the structure for the digital document; B) providing data for at least some of the predefined data elements using content specific selection menus; C) storing the provided data in a database; and D) generating the digital document by compiling at least some of the stored provided data according to the document structure, including by automatically synthesizing text.

FIG. 1 is a block diagram illustrating an automatic authoring and publishing system 100 according to one embodiment of the invention for performing this method. The automatic authoring and publishing system 100 includes a document manager input interface 102, a storage database 110 for use in step (C), and a publishing engine 112. In various implementations, these components of the authoring and publishing system 100 may be separate or integrated software modules that operate to guide a user in authoring a manual, defining data structure and allowable content, storing content as distinct data elements, providing a quick preview of content prior to full publication, and tracking changes from one revision to the next.

The system can be run on a conventional computing device including a processing device, i.e. a microprocessor, with an input interface such as a keyboard.

The document manager input interface 102 preferably includes a document definition manager 103 useful for performing step (A), a document builder 104 useful for performing step (D), a document editor 106, an electronic library manager 107 that manages the stored data, an effectivity interface 109, and an automatic text generator 108 useful for performing step (D).

The document definition manager 103 enables a user to receive and build document definitions. Unlike templates that merely define sections and/or layouts for a document, a document definition can specify data elements, data types, structures, rules and relationships for permissible content as well as electronic libraries associated with the document definition. The document definition manager 103 allows a user to manage defined data structures, create templates, and manage task-oriented function codes. The data structures may be defined by the user or by a regulatory body, such as the Air Transport Association (ATA) in the case of aircraft systems, for example.

Figure 5:
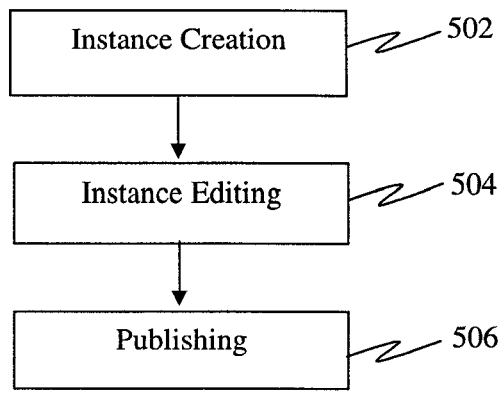
FIG. 5 illustrates logical components for an automatic authoring and publishing system according to one example.

Appendix A provides a portion of an exemplary document structure, and exemplary data elements as part of the document structure. Reference is made to FIG. 5 for assistance in understanding Appendix A. The overall structure of an aircraft maintenance manual includes as data elements a title, an optional legal notice, and one or more chapters, and to the extent any data in the manual has been revised, the revisions start and revisions end markings for that data are specified and at least one chapter is required. Also provided is an identification of required attributes for the manual which include identification of the aircraft's vendor, aircraft model for which the manual is applicable, and the date of the current revision.

Each of the data elements is broken down into sub-data elements. Appendix A provides an example of one of those elements, namely the legal notice, which contains any export control information, a copyright notice, and general legal information. Each data element usually has sub-data elements, and has at least one "#PCDATA" for entry of data. For example, the "chapter" data element has many sub-data elements since it comprises the bulk of the publication. The data element copyright notice comprises a calendar year and the holder of the copyright. The actual data that is provided is the year of the copyright and the holder of copyright, which is reflected by the notation "#PCDATA." Wherever "#PCDATA" appears in the document definition, this is a place for entry of data into the database.

Thus, each data element that is required or optionally included in a published document is broken down into sub-elements, as is done with the legal notice, until reaching the level of the basic data that is stored in the database.

Appendix B is similar to Appendix A, and shows the structure of a task element. As can be seen in Appendix B the task element is comprised of a plurality of sub-elements such as, for example, a key for sorting the task, a change number sub-element "chg", a revision date sub-element "revdate" and a sequence number "seq". Each sub-element of a task element provides information related to the task that can be retrieved from the database. Thus, the effectivity of the document can be altered by each sub-element of the task element.

Figure 6:
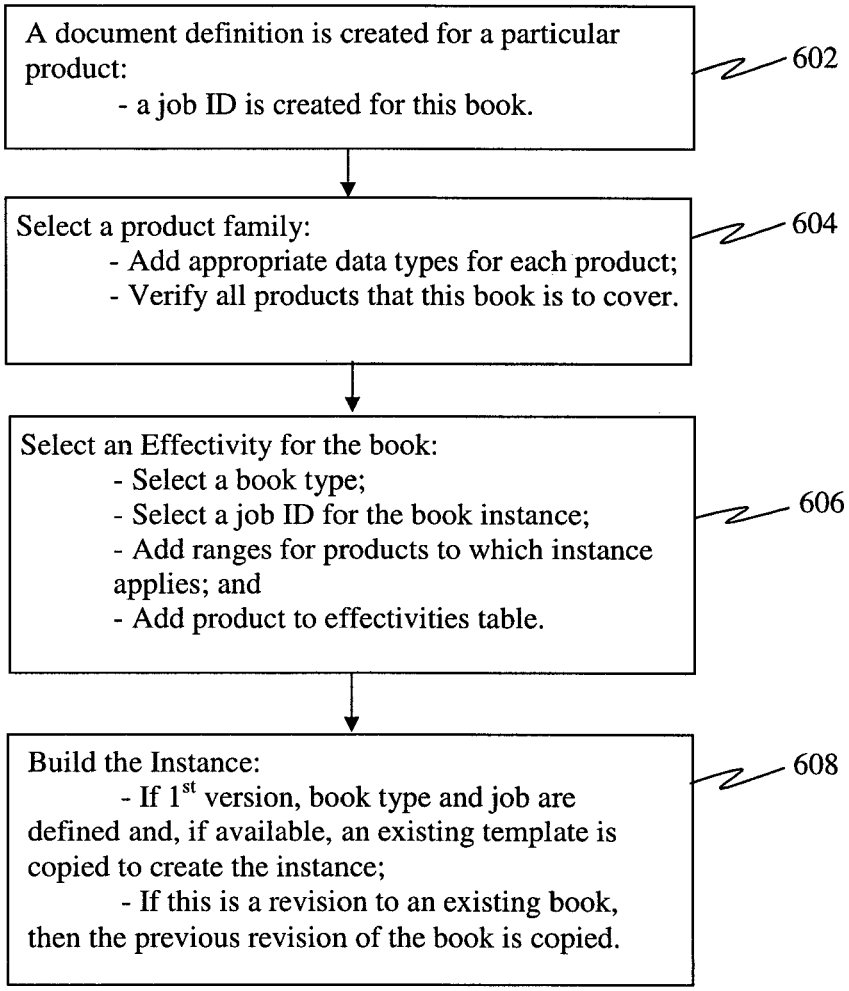
FIG. 6 illustrates a method for instance creation according to one example.
Figure 7:
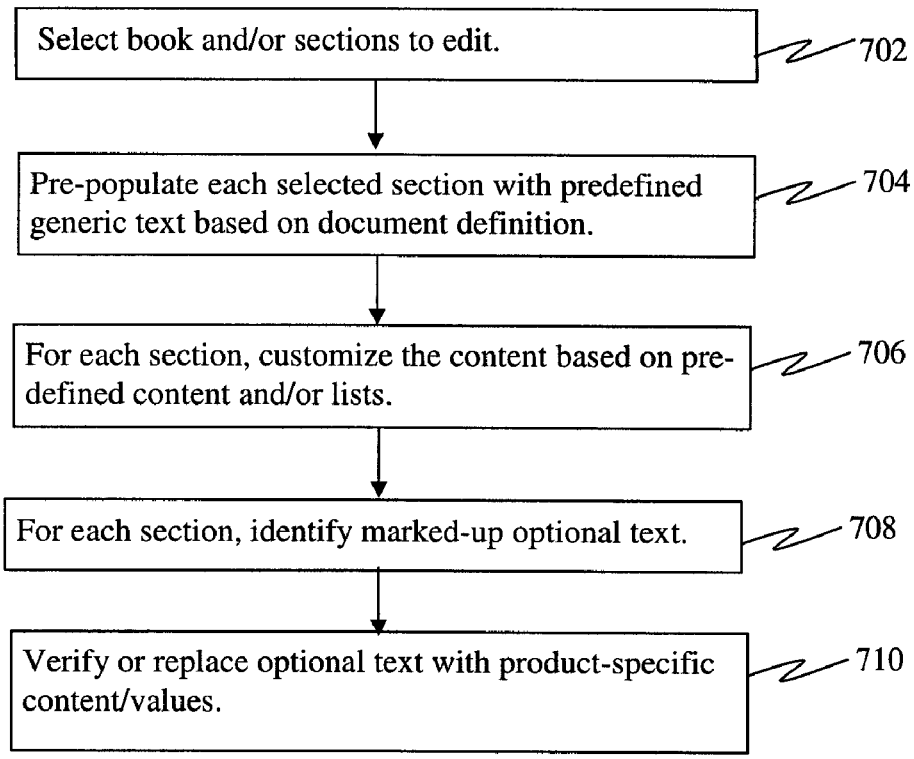
FIG. 7 illustrates a method for editing an instance according to one example.

Appendix C provides a detailed exemplary document definition. Reference is made to FIGS. 5-7 and Appendix A for assistance in understanding Appendix C. The DTD provides a document instance with the requirements of the document structure of Appendix A. Each data element comprises a name field, a type field, and requirements field. The name field is a variable that can be displayed in the document editor 106 and edited. The type field defines the type of data to be included such as, for example, NUMBER to restrict the entry to numeric value only or CDATA for character data. The requirements field insures that data that must be included in the instance is provided such as, for example, a #REQUIRED entry in the requirements field will prevent a valid document instance from publishing if there is no data entered in that portion of the document. Additionally, formatting instructions can be embedded in the DTD such as, for example, "left" aligns the data left justified.

Figure 2:
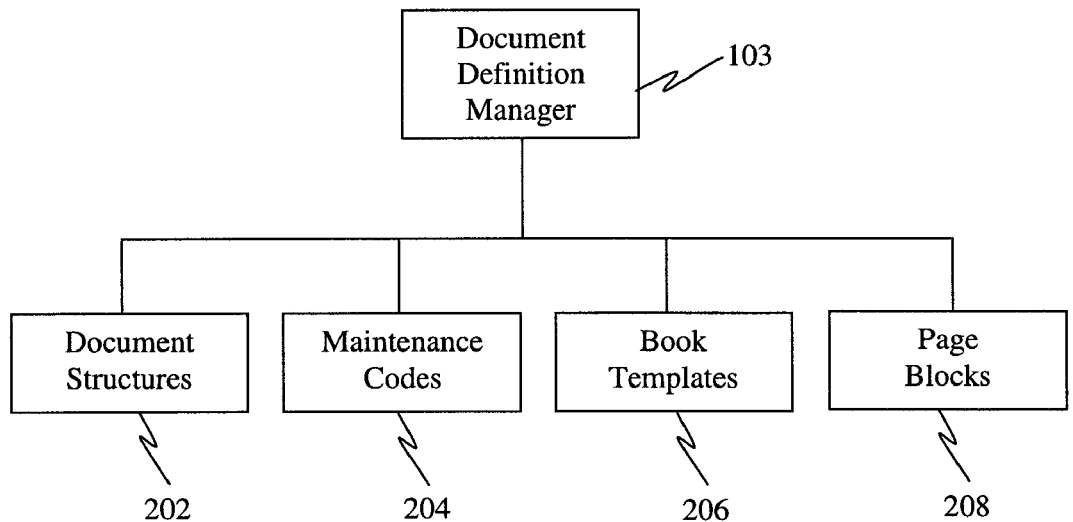
FIG. 2 illustrates one example of components associated with a document definition manager.

FIG. 2 illustrates one example of components associated with the document definition manager 103. The document definition manager 103 includes document definition 202 that define data types, arrangements (e.g., data relationships, rules, etc.), and other characteristics of a book, manual, and/or document or sections thereof. Maintenance codes 204 (e.g., codes specific to a repair or maintenance function of a product or component) are also maintained and/or defined through the document definition manager 103. This allows ready access to these codes when a user is creating a manual or document. Document templates 206 defining the sections and/or organization of particular types of books, manuals, and/or documents are also maintained and/or defined through the document definition manager 103. Page blocks 208, defining font types and/or other page formatting information for a document definition, are also available through the document definition manager 103.

Document definitions can be received from third party sources, such as an aircraft maintenance manual as exemplified by Appendix A. The document definition manager 103 may load a set of default document definitions 202 that the user may customize or the user may create new document definitions to use for a manual. In this manner, a document definition can include a particular data structure, specific set of rules and content, such as attributes applicable to the selected data structures, and a predefined corresponding electronic library that provides the relevant parts, components, and/or tasks associated with a particular product to which the book, manual, and/or document pertains.

The document builder module 104 allows a user to create a new instance (e.g., a particular published book, manual, document, etc.) from one or more document definitions and/or create a revised instance based on a previous version of a published document. The builder module 104 also archives a published book, manual, or document by removing it from the storage database 110 in order to keep the amount of data in database 110 minimized.

Figure 3:
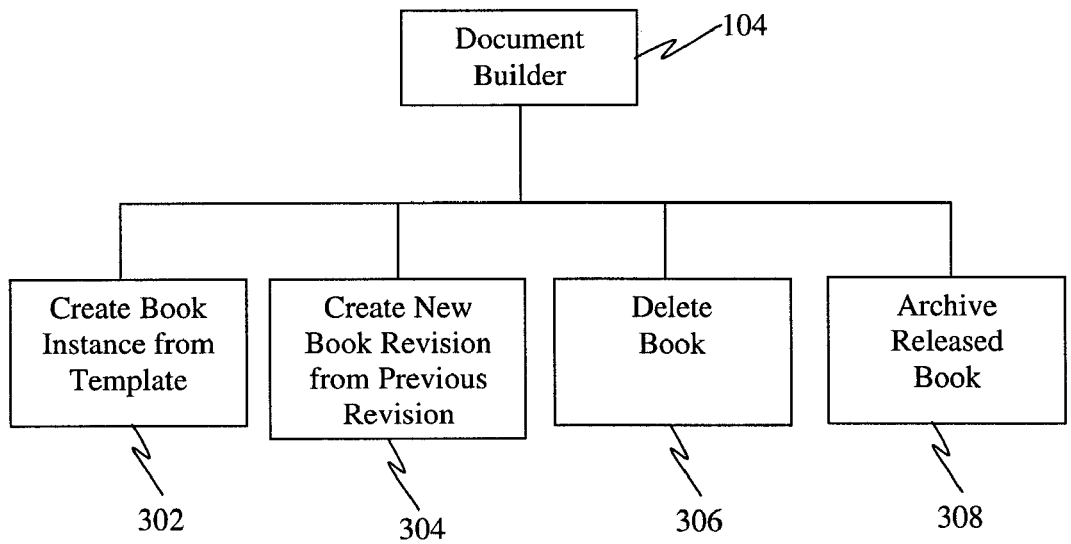
FIG. 3 illustrates one example of components associated with a builder module.

FIG. 3 illustrates one example of components associated with a builder module 104. The document builder 104 is configured to publish a book from a template 302, create a new document revision from a previous revision 304, delete a previously built document from the database 306, and archive a published document 308.

Having defined a particular document definition or previous revision of a book, manual, or document, the user may select and edit one or more parts and/or sections.

A document definition may define the type of permissible content for a particular field, section, paragraph or page of the book, manual, and/or document. For example, one or more tasks for each defined manual field or section may be defined from a predefined set of tasks provided by the document manager input interface 102. The selected manual sections and tasks may be organized as tree-like data structures that are identified by the document definition as shown by the Appendices. In one example, these tasks may define the general steps needed to accomplish a particular installation, removal, and/or maintenance of a particular book, manual, and/or document field or section.

Figure 4:
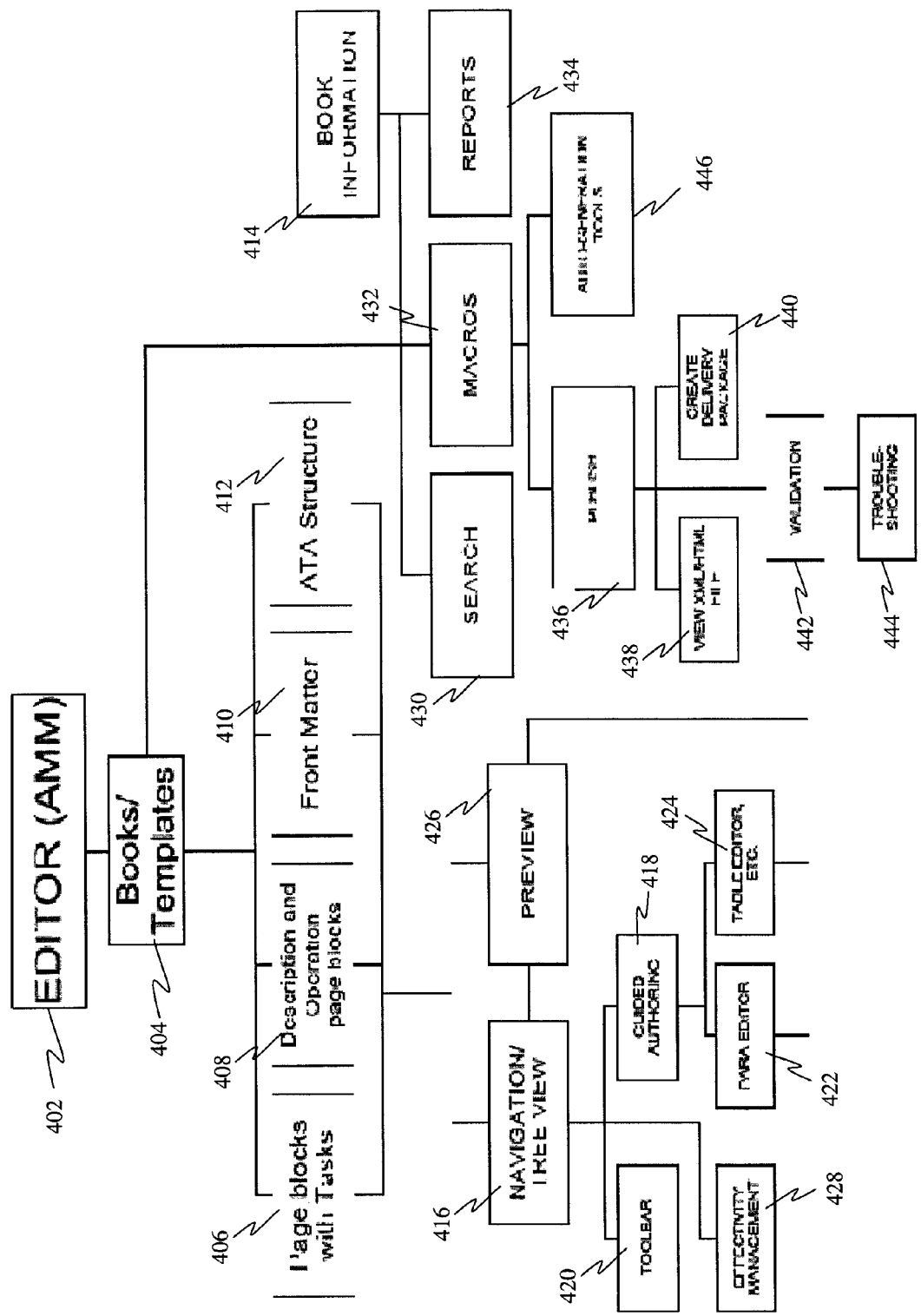
FIG. 4 is a block diagram illustrating an automatic authoring and publishing editor according to one arrangement.

FIG. 4 is a block diagram illustrating an automatic authoring and publishing editor 402 according to one arrangement of the overall system shown in FIG. 1 for the Aircraft Maintenance Manual ("AMM"). The editor 402 serves to create and edit books, documents, and/or templates 404 that are defined by document definitions including page blocks with tasks 406, description and operation page blocks 408, front matter (e.g., generic content for each section) 410, and a specification structure 412. A navigation component 416 provides guided authoring 418 of book content via content selection toolbars 420, a paragraph editor 422, and a table editor 424. An effectivity manager 428 also cross-references particular tasks or system components with products. A preview component 426 allows a user to preview a section or paragraph being edited as it would appear when published.

Additionally, a search component 430 enables a user to search a book, document, and/or template. A reports component 434 is used to generate reports for one or more documents, such as published books while a book information component 414 provides book-specific information (e.g., author, creation date, revision, etc.) A set of macros 432 may be used to publish a book by validating 442 its content, and troubleshooting 444 any publishing/validation problems. The publishing output may be in a XML/HTML file 438 and/or other form out output 440 (e.g., compact disc, etc.). Additionally, the macros 432 may provide other auto-generation tools 446 that generate audio and/or video output from the published books and/or documents.

In validation 442 the published document is compared against user specified rules. Exemplary of the type of rules that can be applied are the following:
  A. Has all required data been entered?
  B. Are all tasks that require opening a circuit breaker also closes the circuit breaker at the end of the task?
  C. Are all part numbers correct?

The errors in the published document can be highlighted to assist the user in correcting the error.

FIG. 5 illustrates logical components for an automatic authoring and publishing system according to one example. These components may implement one or more of the features or steps described in FIGS. 1, 2, 3, 4 and 7. This example illustrates creating a published document (instance 502). Instance editing 504 includes changing a published document such as a book, manual, or document. Publishing 506 generates an output file from the edited instance.

FIG. 6 illustrates a method for instance creation according to one example. A document definition file is created for a particular product 602. A job ID may also be associated with such instance. A product family is selected for such instance 604, and appropriate data types are added for each product. All products for the book are also verified. An effectivity for the book is selected 606. The instance is then built 608 either from a current document definition or from a previous revision of the published document.

FIG. 7 illustrates a method for editing an instance according to one example. A book and/or sections are selected for editing 702. Each selected section is pre-populated with pre-defined generic text (e.g., cover page, service bulletin lists, introduction, glossary, legal notice, etc.) 704. For each section, the content is customized based on pre-defined content and/or lists 706. For each section, marked-up optional text is identified 708. The optional text is verified or replaced with product-specific content/values 710.

Figure 8:
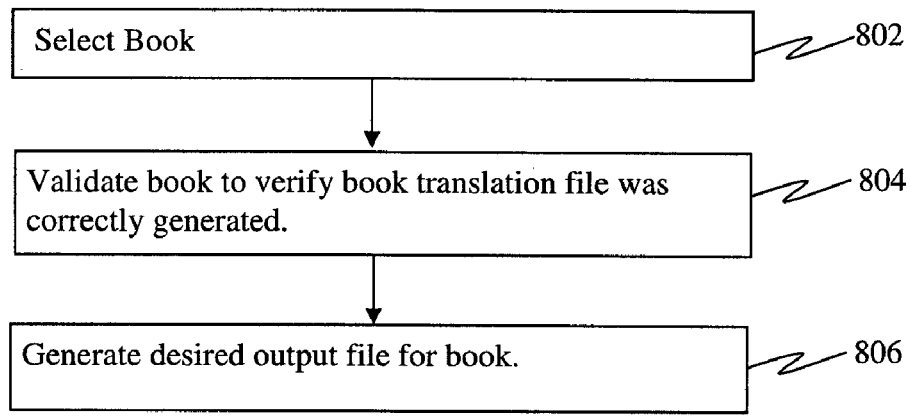
FIG. 8 illustrates a method for publishing a book according to one example.

FIG. 8 illustrates a method for publishing a book according to one example. A previously created book is selected 802. The book is validated 804, and if it passes validation, an output file in a desired format is generated for the book 806. If the book is not validated 804, a red exclamation icon is displayed next to the book in the document builder 104 and the document is invalid and not output until corrected.

Document Editor

Once a digital document has been generated, typically in extensible markup language (XML) format, it exists in the database 110 in machine readable storage medium. The document editor 106 permits an author to edit the digital document according to data structure, rules, and conditions imposed by the editor, which can be configured by using a configuration table or file. Once the digital document has been filed by an author and validated, it can then be published to become part of a new book, manual, and/or document revision.

The document editor module 106 (FIG. 1) allows an author to finalize the content of a digital document to generate a book or manual. The document editor module 106 allows a user to add, delete, and modify the content and structure of a selected book (manual or document). The document editor module 106 can include a dynamically generated menu system based on the content structure, rules, and/or conditions specified in the customized document being used. The content specific selection menus are developed based on the document definition and on customer requirements and/or business rules. The dynamic generation of the menu system is based on the document definition for each element. Customer requirements and/or business rules can be applied to the document to limit the tasks that can be assigned to a user. Customer requirements and/or business rules can be configured by the user to adapt to the specific needs of the final document. For example, a standard business rule for adding audio capabilities to an aircraft may be modified to limit the audio to only the first class section of the aircraft. Customer requirements and/or business rules can be assigned to specific categories to facilitate their use. For example, a customer requirement that all the audio systems on an aircraft can be categorized under "Audio," and the food service can be categorized under "Food." Further customization of the dynamically generated menu system comprises configuring the document editor module 106 by the user. For example, in Appendix A the document definition sets forth an element "AMM—(title, legalntc?, chapter+)" that is interpreted that the document requires one title (title), one or more chapters (chapter+), and an optional legal notice (legalntc?). The context menu at the AMM node dynamically generates menus displaying TITLE, LEGALNTC and CHAPTER. However, a particular customer requirement or business rule can require that the legal notice element is not included and only five chapters are allowed in the final document such as, for example, "AMM—(title, chapter+5)". Therefore, the dynamically generated menus display only TITLE and CHAPTER. Also, a customer can enforce requirements by editing a configuration file for the document editor module 106 or using the "settings" menu of the document editor module 106 to prevent the user from deviating from the rules of the document definition. For Example, the context menu in for the document listed in Appendix A with the above customer requirements configured is TITLE and CHAPTER. The title option is no longer available after the title is inserted and the chapter option is no longer available after 5 chapters are inserted. Other examples of configurable content specific selection menus are: rules for creation of keys for all anchors (anchors are elements with a key attribute used for linking); elements required by customer that are optional in the document definition; attributes that are mandatory by customer that are optional in the document definition; and possible attribute values (not specified in the document definition). Each of the preceding examples dynamically generates content specific selection menus according to the configuration.

Figure 9:
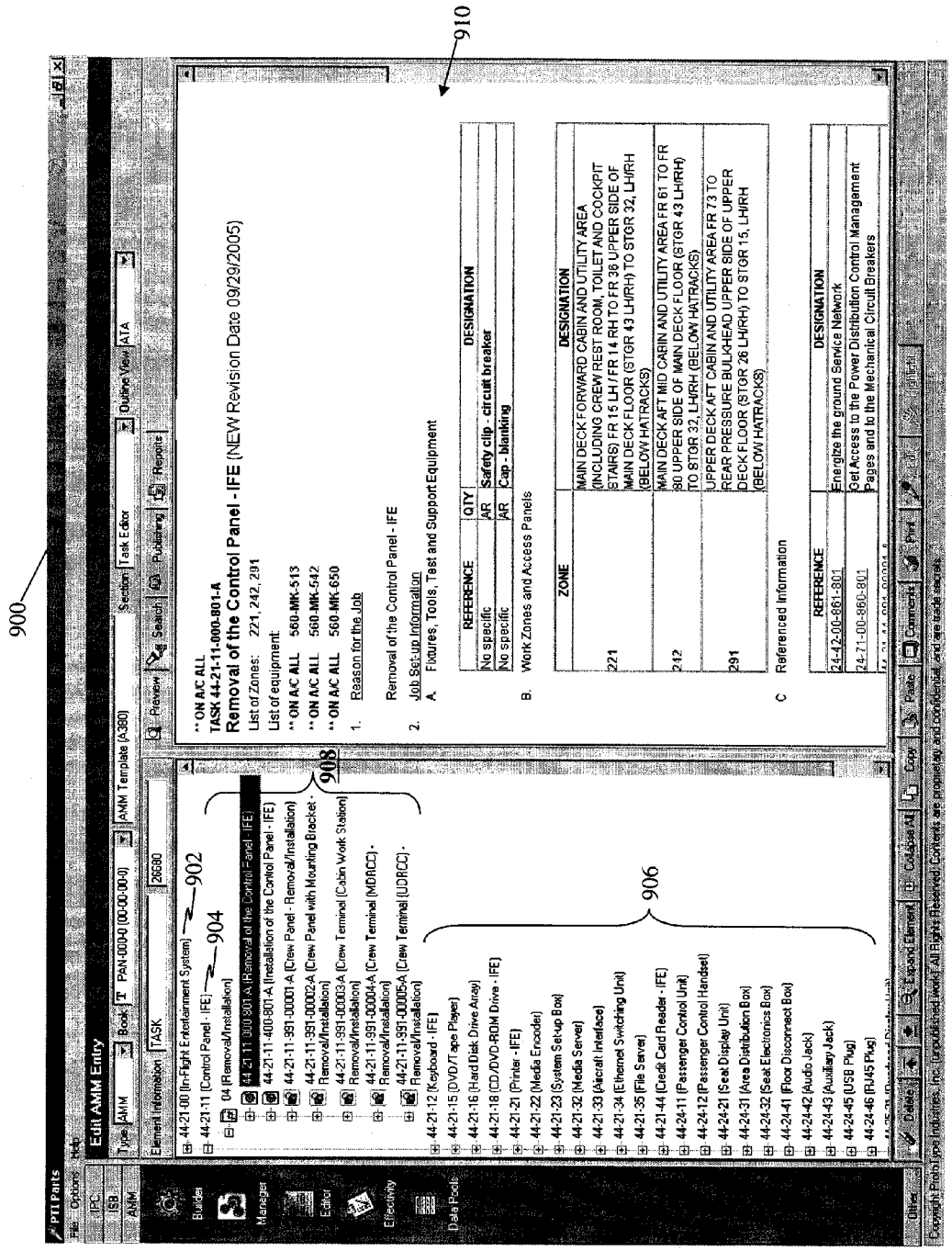
FIG. 9 illustrates a document editor interface that an author can use to open a document template and add content to the document template guided by the structure and rules of the document template to generate a manual.

Such menu system may be selected based on a book type, book number, and section of the book. That is, the document editor module 106 retrieves the data structure, rules, and conditions defined by the document definition (for the book type, book number, and section) and generates one or more menus that guide the author and facilitate generating the manual's contents (e.g., removal, maintenance, installation, instructions or steps). For example, FIG. 9 illustrates a document editor interface 900 that an author can use to open a digital document and add content to the digital document guided by the structure and rules of the digital document to generate a manual. For a defined system (e.g., the In-Flight Entertainment (IFE) System 902), various components 904 and 906 (e.g., Control Panel IFE, Keyboard IFE, DVD/Tape Player, etc.) may be defined in a tree-like structure. For each component 904 and 906, a document definition may define one or more tasks and sub-tasks 908. Thus, an author is guided by the data structure of the document definition to the predefined data elements comprising components and tasks. As a result, the author need not be an expert in the system or components but merely follow the defined document structure and rules imposed by the document definition. For example, a data element can be a hyperlink to a portion of another document using the referenced location, such as, for example an aircraft maintenance manual and a supplier code, such as, for example 1UL05, to create the hyperlink as shown in Appendix B. Another example of creating a hyperlink, as shown in Appendix B so that the operator does not need to be an expert in the system, is by combining an external reference location (refext_refloc="244100861801"), a reference manual type (refman="AMM"), and a part reference (refspl="1UL05">24-41-00-861-801) into: <refext refloc="244100861801" refman="AMM" refspl="1UL05">24-41-00-861-801</refext>. If the data element is a hyperlink to a portion of the same document, the reference location or reference ID can be used to build the hyperlink, such as, for example, <refint refid="EN44210086080100">44-21-00-860-801-A </refint>. A data element can hyperlink to a graphic element in the same document using the reference location or reference ID and the graphic reference such as, for example, <grphcref refid="EN44211199100004001">44-21-11-991-00004-A</grphcref>. With these hyperlinks, the tree-like structure of system components and tasks may be predefined or imposed by a standard. A preview pane 910 also shows the content of the selected task page.

Effectivity

Figure 10:
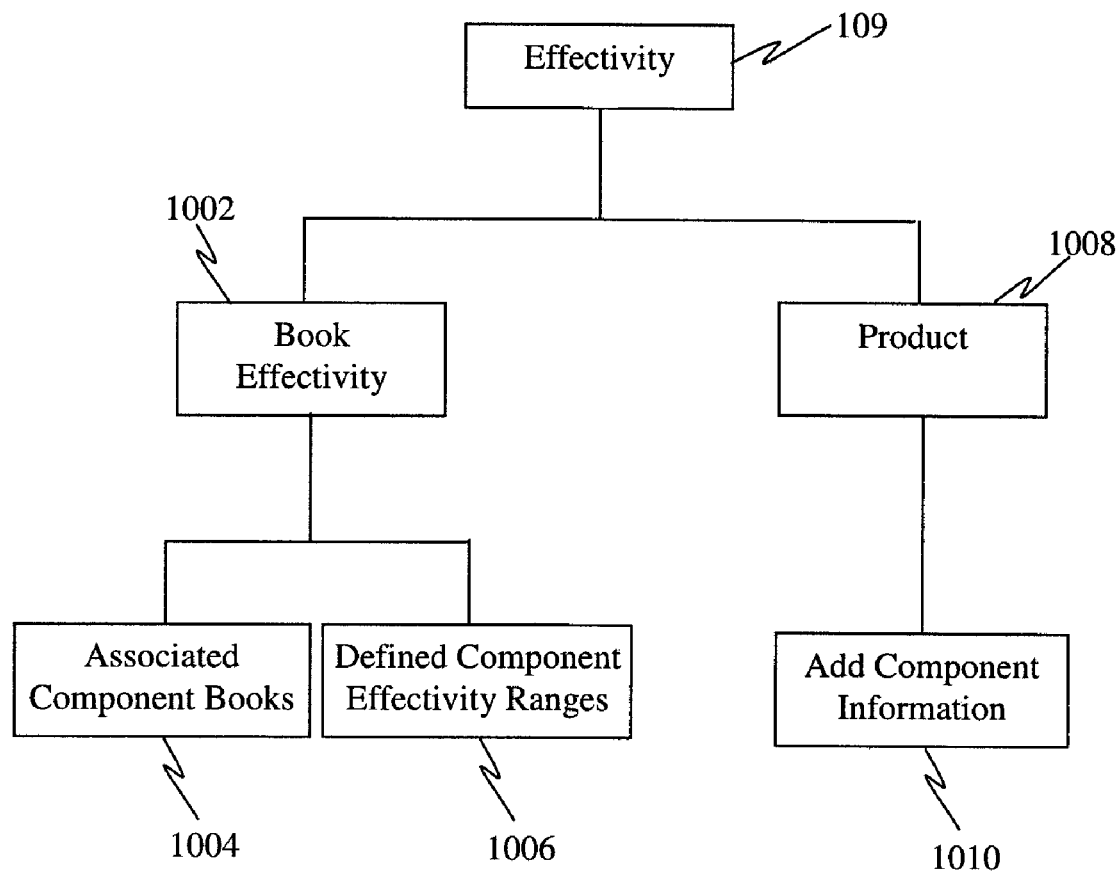
FIG. 10 illustrates the tree-like structure of a document definition.

FIG. 10 illustrates a method implementing an effectivity according to one example. One aspect of the invention introduces the concept of "effectivity" in which particular product-supporting data is associated with one or more products and this association is propagated to documents cross referenced or hyperlinked to the particular tasks or system components. Effectivity is implemented using the effectivity interface 109. Many systems and processes currently in place used for controlling how product data content is linked to the physical product were designed for human interpretation. Effectivity problems become more apparent with the increased use of computers. Computer applications require more consistency than humans to interpret complex data relationships correctly. In addition, as advancements in computing occur, applicability concepts facilitate information management with improved levels of capability.

Effectivity allows for the propagation of application-specific or model specific information throughout a manual so that all applications or models covered by a particular manual are accurately supported. In one embodiment, as can be seen in FIG. 10, the effectivity interface 109 provides a method of combining product information 1008 to alter the effectivity of a book 1002. The addition of a new component 1010 in the product 1008 automatically alters both the associated component books 1004 and optionally the defined component ranges 1006. For example, if bolts used in affixing an overhead compartment to the fuselage of an aircraft are replaced by an improved fastener, the data element representing the bolt is replaced with a new individual element representing the new fastener. Because of the effectivity, the system propagates this change to the documents that contain the bolt and automatically updates the documents.

Automatic Text Generator

In one embodiment, the document manager input interface 102 (FIG. 1) also incorporates the automatic text generator 108 of the syntax of textual data. The textual data elements are syntactically joined with the appropriate linguistic rules prior to outputting a document or manual. The automatic text generator 108 can generate one or more manual tasks, such as assembly instructions, disassembly instructions, test procedures, cleaning procedures, repair procedures, inspection procedures, operation procedures, or other required text, within the automatic text generator's 108 lexical capabilities. One implementation of the automatic text generator 108 is disclosed in U.S. patent application Ser. No. 10/887,162, filed Jul. 7, 2004, for a "System and Method for Generating Text" by Grigoriadis et al., which is hereby incorporated by reference in its entirety.

Data Storage

Another feature of a system according to the present invention provides the electronic library manager 107 (FIG. 1) that allows a user to manage standard data structure types, i.e., standardized data to be provided for data elements. The electronic library manager 107 allows a user to add, delete, and/or modify data that is standard in particular data structures, thus customizing them for particular applications and making them readily available to be inserted into a digital document by a user, thereby avoiding error and inconsistencies.

The storage database 110 is a repository for received data that can include text, graphics, parts and other items that can be reused in multiple documents or are unique to specific documents. The data can comprise diagrams, procedures for operation, maintenance, and cleaning of the unit or a list of tools required to perform a task. The data can comprise price, quantity, availability and reordering data, each data element requiring data. For ease of generating an output document, data elements can be grouped together as data units.

Figure 11:
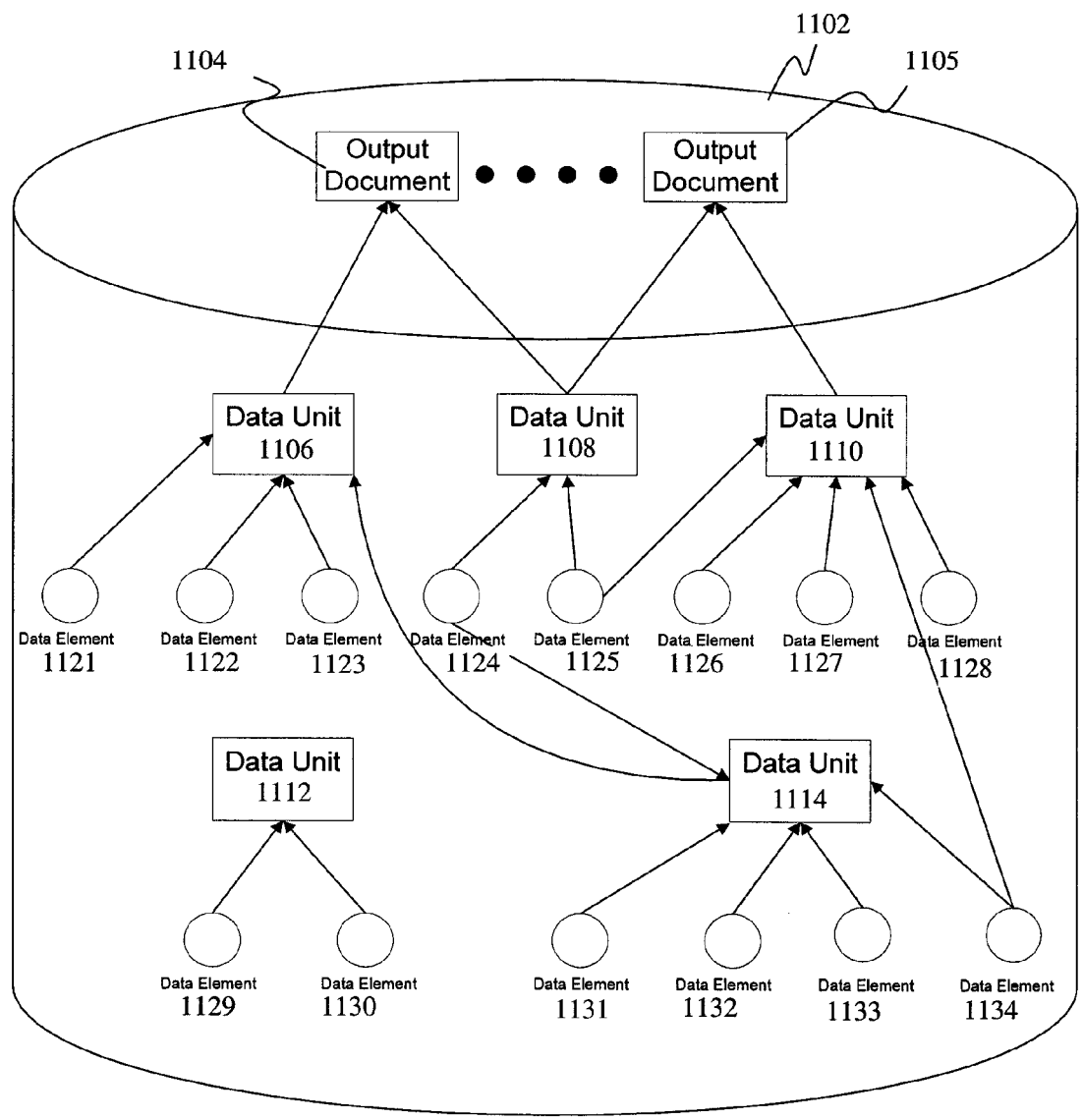
FIG. 11 is a block diagram illustrating the data structure of a relational storage database according to one embodiment of the invention.

FIG. 11 is a block diagram illustrating the data structure of a relational storage database 1102 according to one embodiment of the invention. Output documents 1104 and 1105 are compiled from data elements 1121-1134 that define content in a bottom up approach. Data units 1106, 1108 and 1110 are composed of one or more data elements 1121-1134 or data units 1112 and 1114. A single data element 1124 may be used in multiple data units 1108 and 1114. Additionally, a first data unit 1114 may be used as part of a second data unit 1106. The links between data elements 1121-1134 are dynamically created as data is structured and the data elements 1121-1134 can be used in multiple different output documents 1104 and 1105 or manuals. A modification to a data element 1124 or a data unit 1114 automatically updates the output documents 1104 and 1105 that have the data element 1124, or the data unit 1114 contained within them, obviating the need to manually or individually update the output documents 1104 and 1105. Data elements 1121-1134 may contain manual or document content, content attributes, rules and/or conditions as distinct components of a data structure or unit. For example data element 1122 may contain a chart or graphic while data element 1123 contains a maintenance procedure.

One feature provides a revision history of data elements 1121-1134 and/or output documents 1104 and 1105 so that prior versions of the output documents 1104-1105 can be reproduced. The revision history can be stored in the storage database 110. In another embodiment, data elements 1121-1134 contain security levels that restrict user access to modify the data elements 1121-1134.

In some embodiments, the document editor 106 is configured to place data elements 1121-1134 in a tree-like structure. The user can modify the tree-like structure, add content to the elements in the tree-like structure, and/or display a preview of a modification to the tree-like structure. For example, a user can move document data elements 1121-1134 from an existing tree-like structure to another tree-like structure (i.e. cut and paste the document data elements 1121-1134), or copy a part or the entire tree-like structure into a new or existing document definition. User modifications to the tree-like structure operations need not affect the document data elements 1121-1134, only the structure or relationship of the document data elements within the tree-like structures. In one embodiment, the document data elements 1121-1134 are selected from the group consisting of one or more text, quantity, descriptions, procedures and graphical metadata.

In one embodiment, the publishing engine 112 for producing output from the system is configured to gather document data elements 1121-1134 and place them in a predetermined form according, for example, to a document template. The publishing engine 112 may add images to the predetermined form, for example, a maintenance troubleshooting flowchart.

Document Translations

By using structured document definitions, translation of a book or manual into various languages (e.g., Japanese, German, French, Russian, Chinese, Arabic, English, etc.) is facilitated. The tagging of standard sentences such as warnings, cautions, circuit breaker lists may facilitate automatic translation. This also allows translating the text within technical illustrations.

Customized Structured Document Generation

Figure 12:
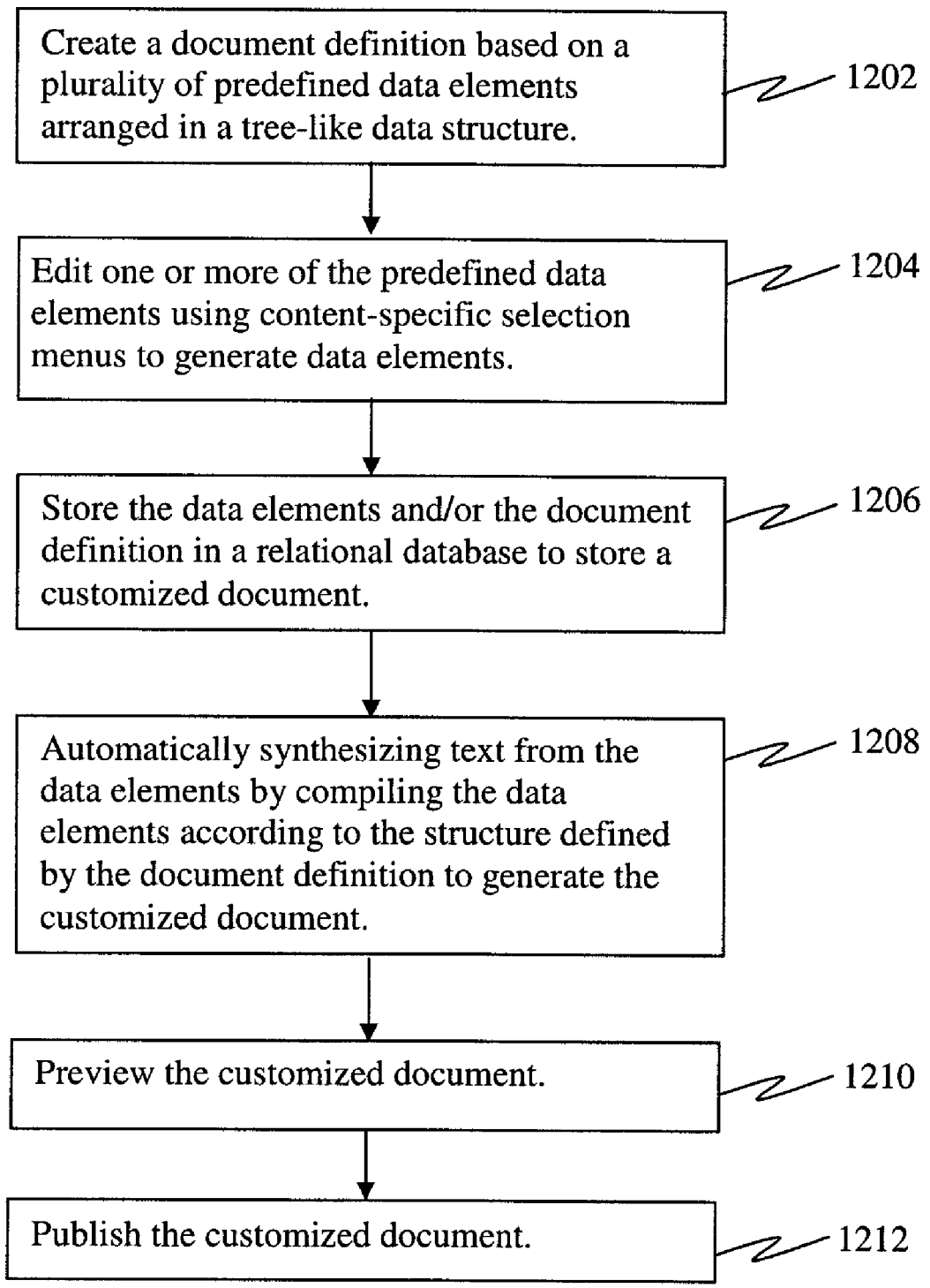
FIG. 12 illustrates a method for authoring a manual using a guided and structured document generation system according to one embodiment of the invention.

FIG. 12 illustrates a method for authoring a manual using the structured document generation system 114 (FIG. 1) according to one embodiment of the invention. A document definition is defined based on a plurality of predefined data elements arranged in a tree-like data structure 1202. The document definition can be obtained from an outside source or using a pre-existing document definition. The obtained document definition can be edited 1204. Thus, one or more of the predefined data elements can be edited. Data is provided for the data elements using content specific selection menus. The data elements and/or the document definition are stored in a relational database 1206. Text from the data elements is automatically synthesized by compiling the data elements according to the structure defined by the document definition to generate a digital document 1208. To publish a document such as in PDF format the document to be published can optically be previewed 1210, and then published 1212. To preview the document 1210, the publishing engine 112 generates a dynamic XML cache file from data elements retrieved from the storage database 110. The cache file is transformed on the fly to an HTML web preview in a window in the document editor 106. The HTML web preview shown is a complete published document. Optionally the published document can be validated.

Publishing Engine

The publishing engine 112 (FIG. 1) can comprise a structured document (e.g., XML) generator 114 for generating a digital document, and any specified final document output format 118. The publishing engine 112 operates in real-time as data is edited, added, deleted, etc. The output published document can be hard copy and/or stored in a storage medium. The publishing engine continuously updates the database tables when changes are made by a user, which in turn updates a cached output data file, thereby updating the document preview. In one embodiment, the publishing engine 112 uses a structured document (e.g., XML) as an intermediate step prior to publishing.

The final output format 118 can be based on the Standard Generalized Markup Language (SGML). The output published document can be hard copy and/or stored in a storage medium. SGML is an ISO standard: ISO 8879:1986 information processing language. SGML allows the writer to be focused on the structural aspects of a document and leave the visual presentation of that structure to the publishing engine 112. SGML supports the development of common retrieval systems as well as the creation of product databases. The use of common elements and structures for all documents promote the use of common software such as parsers, printing and display software using Format Output Specification Instances (FOSIs), SFQL clients and SFQL servers.

In other embodiments the document output can be in any desired output format, for example, such as HTML, PDF, XML, SGML, RTF, plain text, etc.

Figure 13:
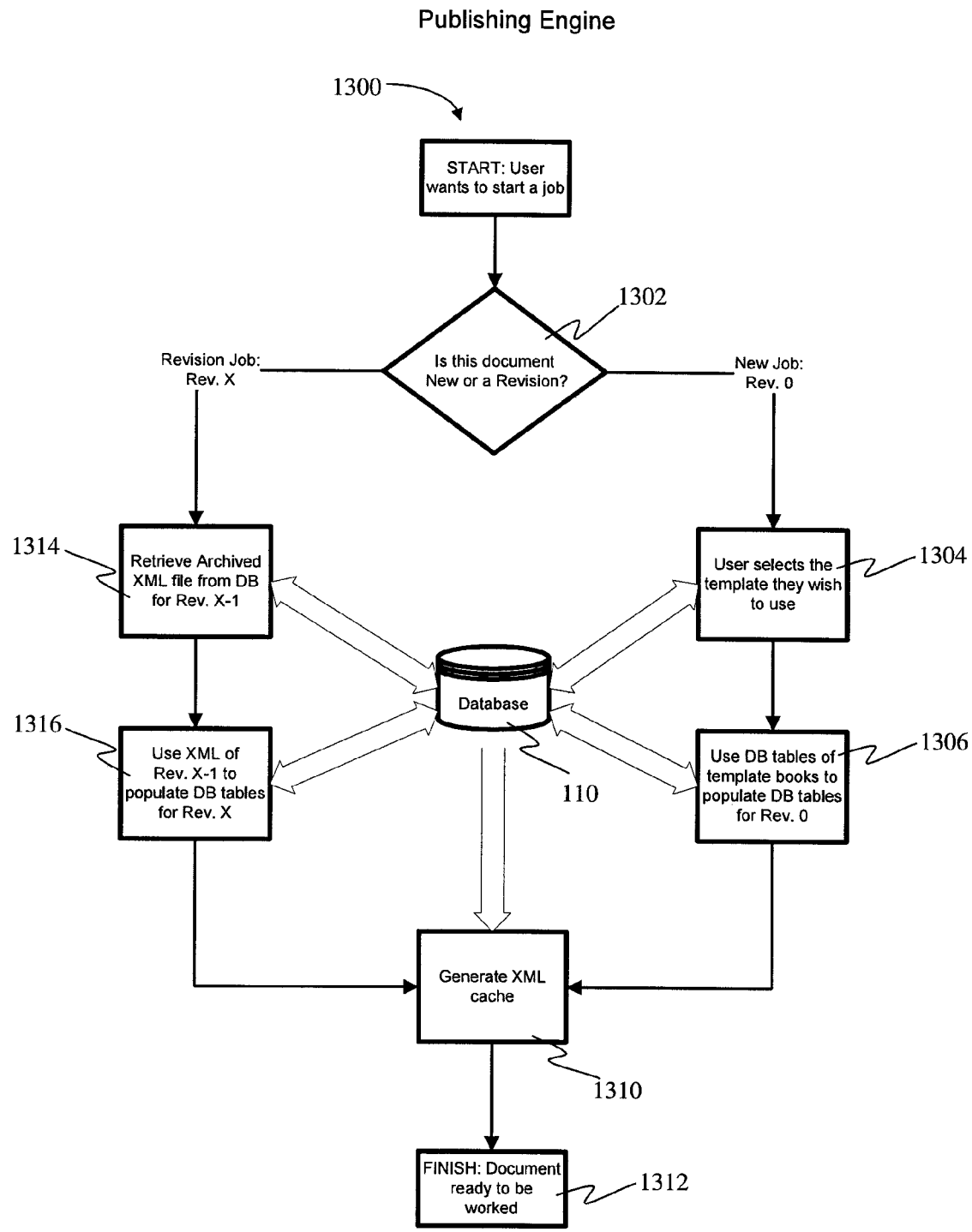
FIG. 13 illustrates a method for operating a publishing engine according to one embodiment of the invention.

FIG. 13 illustrates a method 1300 for operating the document builder 104 according to one embodiment of the present invention. In this embodiment, the method comprises the steps of first selecting 1301 to build a new document or to revise a document 1302. Then, if the document is a new document the user selects a template 1304. Next, the template tables are populated 1306 with data elements 1121-1134 (FIG. 11) from the database 110. Then, the document builder generates an XML cache 1310 of the new document. Next, the document can be edited 1312 by the document editor 106 (FIG. 1). If the document is a document revision, then an XML document file 1314 is retrieved from the database 110. Next, the retrieved XML document file 1314 is populated 1316 from the database 110. Then, the revised document is generated 1310 in XML format. Next the revised document 1312 can be edited by the document editor 106.

Figure 14:
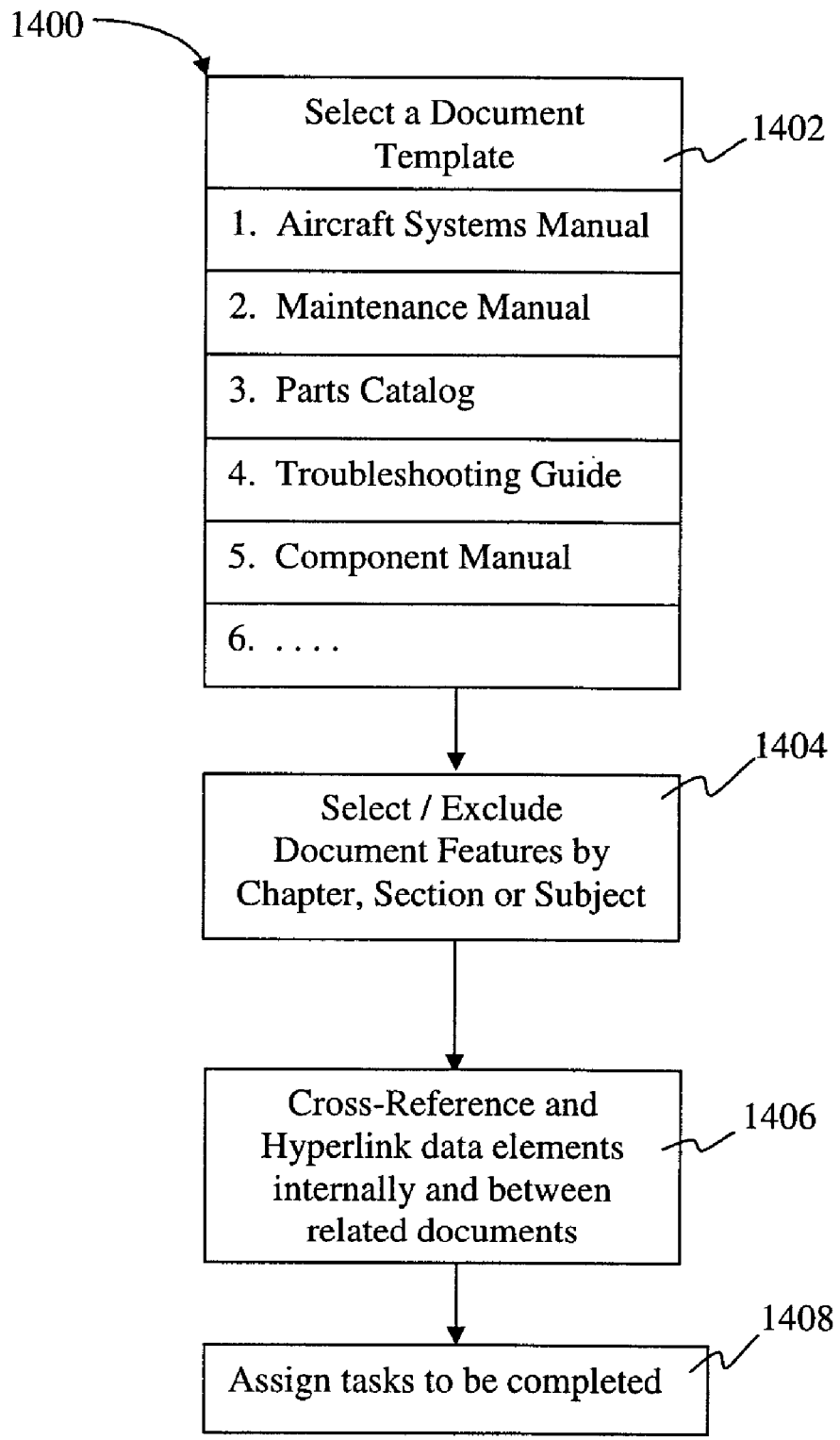
FIG. 14 illustrates a method for authoring a document using the automatic authoring and publishing system according to one embodiment of the invention.

FIG. 14 illustrates a method 1400 for authoring a document using the automatic authoring and publishing system according to one embodiment of the invention. A document template for a particular document, such as an aircraft system manual, a maintenance manual, a parts catalog, a troubleshooting guide or a component manual, is selected 1402. In other embodiments the list of available document templates can be related to the final documents to be output from the system, the government/industry standards for documents, or by client design. Document template features 1404 (i.e. charts, diagrams, procedures, text, etc.) can be selected or excluded from the document being authored by the user. These features may be selected or excluded on various levels of the document including by the chapter, section, and/or subject. Various data elements may also be cross-referenced and/or hyperlinked internally and between related documents 1406. This permits storing content as structured data elements rather than as a single document. A set of tasks are then defined to be completed by an author in order to finalize or complete a document or manual 1408. This may include customizing a document template for a particular type of product or operation. Thus, document templates and corresponding data structures are formed according to this method.

Figure 15:
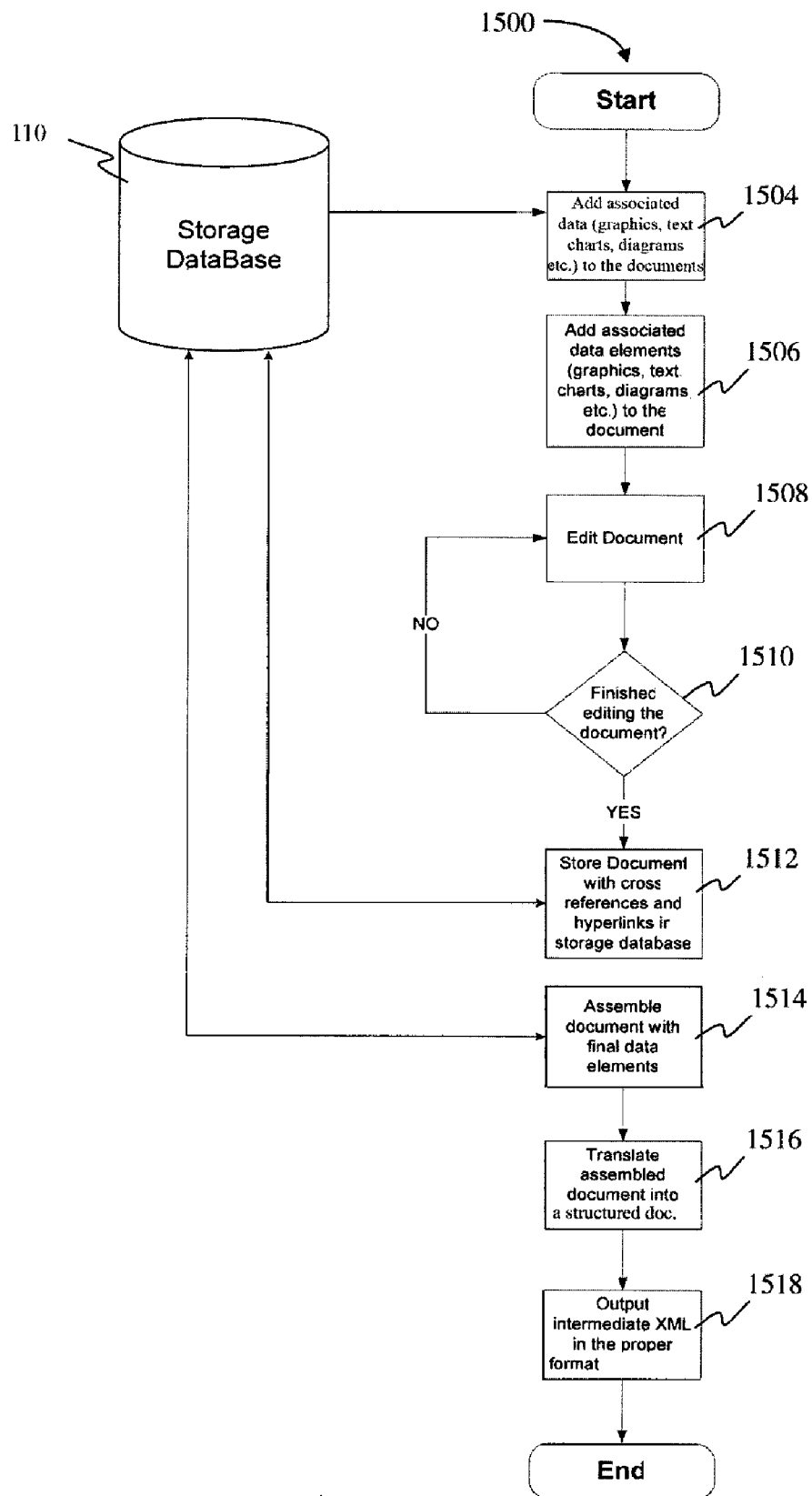
FIG. 15 illustrates a method for authoring and generating a document according to one embodiment of the invention.

FIG. 15 illustrates a method 1500 for authoring and generating a document according to one embodiment of the invention. A document template is retrieved in step 1504 from the storage database 110. The associated data (i.e., graphics, text, charts, diagrams, etc.) defined by the document template from the storage database 110 are provided in step 1506 to yield a document. The document provided in step 1506 is an XML cache file providing rapid updates to the document during editing 1508 and the quick generation of previews during the editing 1508 step. The user may edit the document 1508 by customizing data elements to conform to an industry specification or a client requirement until the document is complete 1510. The document is stored 1512 in the storage database 110 with cross references and hyperlinks to common data elements. A compiled document is assembled 1514 with the data elements translated into a structured document format 1516. The intermediate XML formatted document is output in the format specified by the user 1518.

Figure 16:
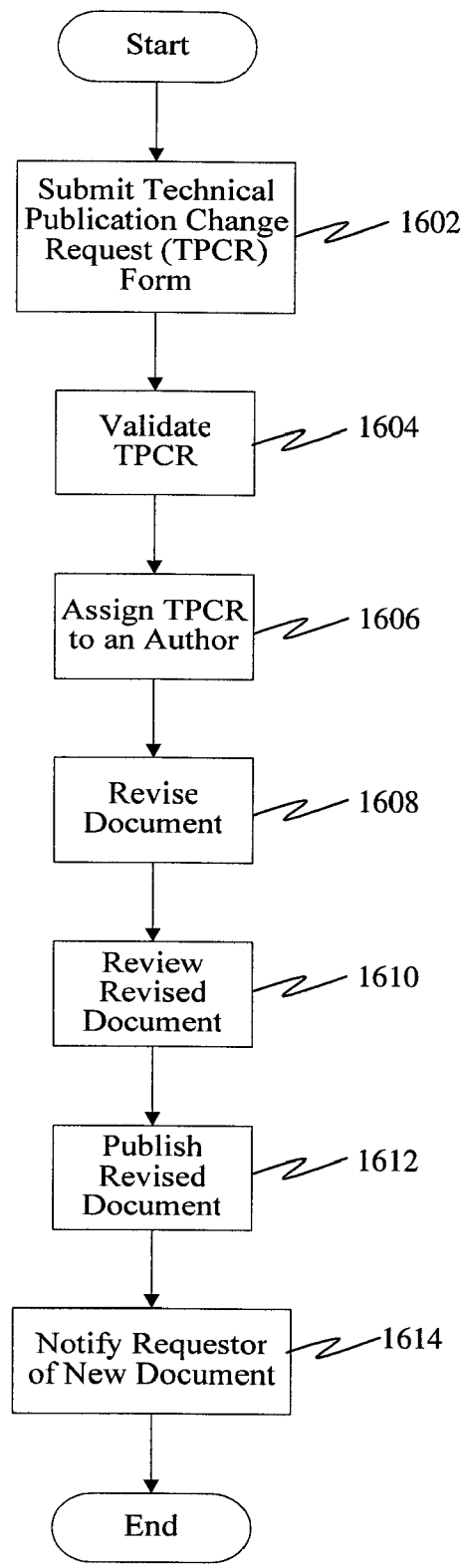
FIG. 16 illustrates a method for processing an internet-based client document change request application according to one embodiment of the invention.

FIG. 16 illustrates a method 1600 for processing an internet-based client document change request application according to one embodiment of the invention. A technical publication change request form is submitted by a client 1602. The submitted technical publication change request form is automatically sent to a reviewer for validation 1604. For example, certain fields may be required to be completed before the request can be assigned, or the submission is returned to the requester with a request for the missing information. The submitted technical publication change request is assigned to an author 1606 to revise 1608 the document. The revised document is reviewed 1610 for errors and is then sent for independent review to insure accuracy prior to being published 1612. For example, if the technical change request involves an engineering change to an aircraft, a certified aircraft engineer may review the documentation change to insure the accuracy of the revision. A response is sent to the requester that action has been taken on the submitted technical publication change request and that the updated document is available 1614.

Figure 17:
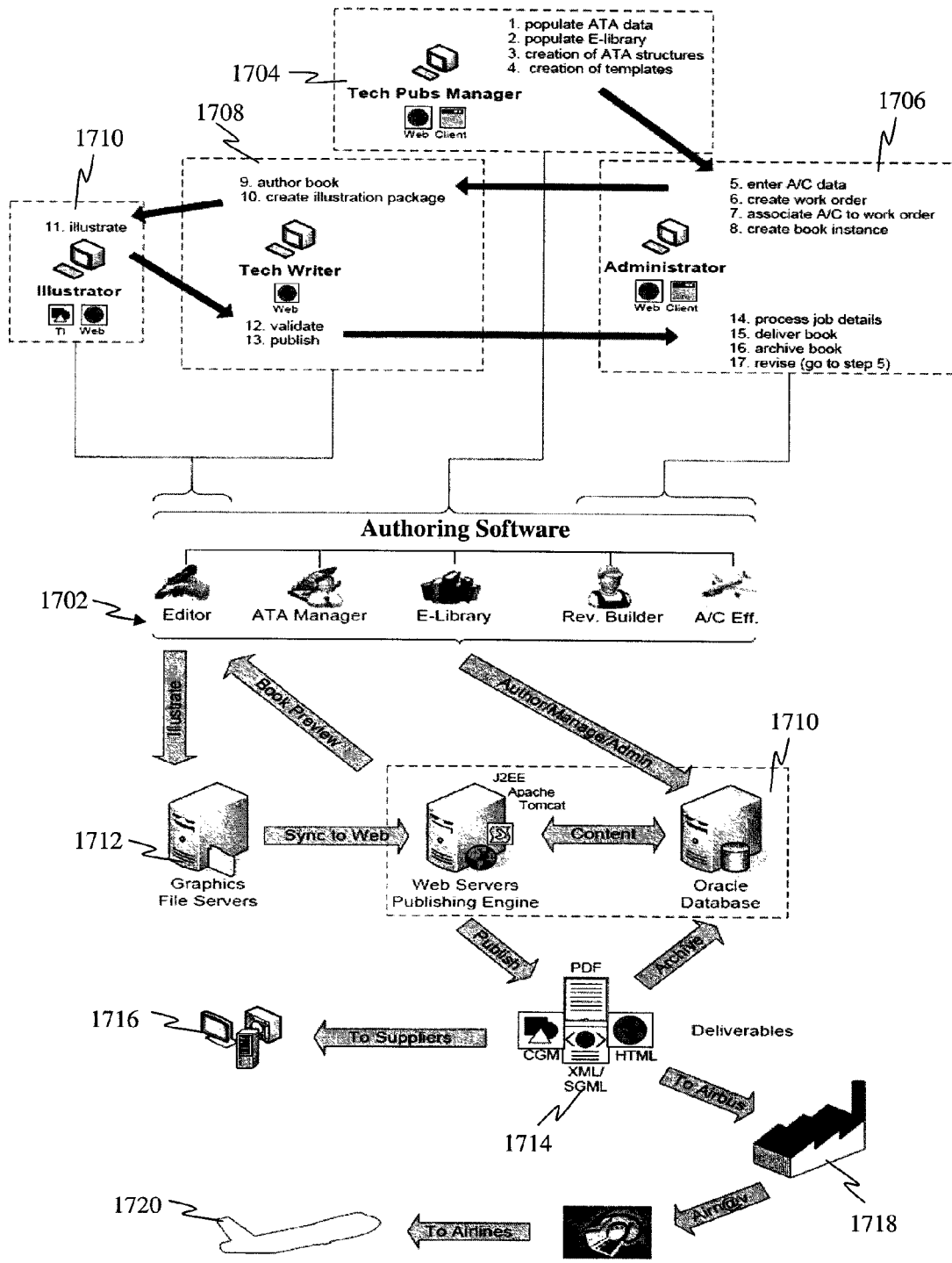
FIG. 17 is a block diagram illustrating the automated authoring and publishing software as may be implemented by the airline industry.

FIG. 17 is a block diagram illustrating the automated authoring and publishing software as may be implemented by the airline industry. The authoring and publishing software 1702 starts by (a) obtaining data corresponding to the pertinent aircraft, (b) populating electronic libraries with supporting functions, tasks, and/or data for the aircraft, (c) creating data structures specific to a particular aircraft, and (d) creating document definitions based on the data structures 1704. An administrator 1706 then defines a book by (a) entering aircraft-specific data, (b) creating a work order, (c) associating aircraft to the work order, and (d) creating a published book 1706. An author 1708 then writes or edits the book and creates illustrations 1710. Once created, the book is validated and published. Once published 1714, the book may be distributed to suppliers 1716, manufacturers 1718, archival servers 1710 and 1712, and to airliners 1720. Such books may include maintenance, repair, and installation information for the various components of an aircraft or family of aircraft.

Another embodiment provides an apparatus comprising a machine readable medium containing instructions that, when executed, cause the machine to perform operations of loading a document definition. Parts of the document definition can then be selected or excluded. Individual document elements are retrieved from a storage database and inserted into the predefined data elements. Text is automatically generated and inserted into the predefined data elements. The predefined data elements data are stored together in the storage database. An output format for the new document is selected. The new document is then encoded as an extensible markup language file. The extensible markup language file is converted to the output format selected by the user using an extensible stylesheet language transform. The new document is then published in the output format selected.

The document authoring and generation system has many advantages over the prior art in terms of data production, distribution, modification, and usage.

Data production is improved by the automatic authoring and publishing system by using a single data source for multiple documents, the automation of effectivity management, reducing paper handling thereby improving flow time, improvement in quality, improved productivity through use of common data libraries, and/or a greater adherence to formatting, style and structure of a document.

Data distribution is improved by having more complete data sources, improved document and data delivery time, and decreased shipping costs (e.g., electronic data shipping versus paper documents/manuals).

Data modification is improved by decreasing the time needed to incorporate modifications, decreasing the costs of re-authoring or editing a document, and making automatic translation of documents (e.g., into different languages or formats) possible.

Data usage is improved by retrieval software/browsers resulting in improved access time to digital data, searching of pertinent data utilizing the intelligence of the data structure, data customization based on document definitions.

Lastly, the data revision process is also improved in terms of revision control, revision time, and automated revision markings.

It should be noted that the scope of the present invention is not limited to a system that has all of these advantages.

What has been described is a new and improved system and method for automatically authoring and publication of documents overcoming the limitations and disadvantages inherent in the related art. Although the present invention has been described with a degree of particularity, it is understood that the present disclosure has been made by way of example. For example, the present invention is not limited to aircraft manuals but may be implemented with any other products (e.g., cars, boats, electronics, etc.) where manuals are needed. Since various changes could be made in the above description without departing from the scope of the invention, it is intended that all matter contained in the above description or shown in the accompanying drawings shall be illustrative and not used in a limiting sense.

What is claimed is:

1. A method of preparing a customized document about a product, the method comprising the steps of:
   a) providing a user with a document manager input interface on a computer, the input interface including a definition manager module, an electronic library manager module, an automatic text generator module, a document editor module, an effectivity interface module, and a document builder module;
   b) on the computer, obtaining a document definition based on a plurality of predefined data elements arranged in a tree-like data structure using the definition manager module, the predefined data elements being retrieved from a parts library contained in the document builder module, wherein the document definition comprises at least one of (i) a document structure for the customized document and (ii) page formatting information;
   c) on the computer, creating the customized document from the document definition using the definition manager module;
   d) on the computer, storing the customized document in a relational database;

e) on the computer, providing data for at least some of the predefined data elements using content-specific selection menus to generate revised data elements that are stored in the relational database;

f) on the computer, deconstructing syntax of textual data elements that are syntactically joined with linguistic rules, specifiying a category in which to place a business rule, generating one or more tasks associated with the business rule, and applying the business rule to the textual data elements of the customized document using the automatic text generator module;

g) on the computer, modifying given data that is standard in particular data structures, and customizing the given data for particular applications using the electronic library manager module;

h) on the computer, establishing effectivity associations, using the effectivity interface module, for a given component of the product, and thereby defining a manner in which a change to the given component is propagated throughout the customized document;

i) in response to the user making the change to the given component via the effectivity interface module, propagating the change throughout the customized document according to the effectivity associations established by the user;

j) synthesizing at least one (i) text, (ii) graphics, and (iii) the revised data elements according to (i) the document definition defined by the document definition module, (ii) edits made by the user via the document editor module, (iii) the business rule applied by the user via the automatic text generator module, (iv) the customized data provided by the electronic library manager module, and (v) effectivity associations established via the effectivity interface module; and k) generating and publishing the customized document.

2. The method of claim 1, wherein the step of providing the data comprises providing text, graphics, and hyperliniks.

3. The method of claim 2, wherein at least one of the hyperliniks is to a section of the customized document.

4. The method of claim 1, wherein at least some of the predefined data elements have effectivity.

5. The method of claim 1, comprising the additional step of creating a document template by selecting portions of the customized document and storing the selected portions in memory.

6. The method of claim 1, further comprising dynamically generating the content specific selection menus.

7. The method of claim 1, further comprising publishing the customized document into a published document having a readable format.

8. The method of claim 7, wherein the customized document is an extensible markup language document, and where publishing the customized document comprises:
(i) forwarding the extensible markup language document to an extensible transform; and
(ii) outputting the extensible markup language document from the extensible transform as the published document.

9. The method of claim 8, wherein the published document is in a format selected from the group consisting of HTML, SGML and PDF.

10. The method of claim 7, wherein the customized document and the data relate to complex equipment and the data includes tools for repairing the complex equipment, and the published document comprises a listing of at least some of the tools.

11. The method of claim 7, further comprising previewing the document to be published prior to publishing.

12. The method of claim 7, further comprising:
receiving an internet-based change request to the published document; and
effecting the requested change to the published document.

13. The method of claim 7, further comprising subjecting the published document to validation rules.

14. The method of claim 1, further comprising:
providing revision markings automatically on the published document by comparing the customized document to a previously archived document, on the fly, while publishing.

15. A method of preparing customized documents about a product, the method comprising the steps of:

a) providing a user with a document manager input interface on a computer, the input interface including a definition manager module, an electronic library manager module, an automatic text generator module, a document editor module, an effectivity interface module, and a document builder module;

b) on the computer, obtaining a document definition based on a plurality of predefined data elements arranged in a tree-like data structure using the definition manager module, the predefined data elements being retrieved from a parts library contained in the document builder module, wherein the document definition comprises at least one of (i) document structures for the customized documents and (ii) page formatting information;

c) on the computer, creating the customized documents from the document definition using the definition manager module;

d) on the computer, storing the customized documents in a relational database;

e) on the computer, providing data for at least some of the predefined data elements using content-specific selection menus to generate revised data elements that are stored in the relational database;

f) on the computer, deconstructing syntax of textual data elements that are syntactically joined with linguistic rules, specifiying a category in which to place a business rule, generating one or more tasks associated with the business rule, and applying the business rule to the textual data elements of the customized documents using the automatic text generator module;

g) on the computer, modifying given data that is standard in particular data structures, and customizing the given data for particular applications using the electronic library manager module;

h) on the computer, establishing effectivity associations, using the effectivity interface module, for a given component of the product, and thereby defining a manner in which a change to the given component is propagated throughout the customized document;

i) in response to the user making the change to the given component via the effectivity interface module, propagating the change throughout the customized document according to the effectivity associations established by the user;

j) synthesizing at least one (i) text, (ii) graphics, and (iii) the revised data elements according to (i) the document definition defined by the document definition module, (ii) edits made by the user via the document editor module, (iii) the business rule applied by the user via the automatic text generator module, (iv) the customized data provided by the electronic library manager module, and (v) effectivity associations established via the effectivity interface module; and k) generating and publishing first and second different customized document.

16. The method of claim 15, wherein the second customized document contains at least one hyperlink to the first customized document.

17. The method of claim 15, comprising the step of previewing the customized document in a preview mode before step (k).

18. An automated system for preparing a customized document about a product, the system comprising:
   a processor coupled to an input interface;
   a storage device coupled to the input interface and the processor, the storage device comprising code causing the processor to:
   a) provide a user with a document manager input interface on a computer, the input interface including a definition manager module, an electronic library manager module, an automatic text generator module, a document editor module, an effectivity interface module, and a document builder module;
   b) obtain a document definition based on a plurality of predefined data elements arranged in a tree-like data structure using the definition manager module, the predefined data elements being retrieved from a parts library contained in the document builder module, wherein the document definition comprises at least one of (i) a document structure for the customized document and (ii) page formatting information;
   c) create the customized document from the document definition using the definition manager module;
   d) store the customized document in a relational database;
   e) provide data for at least some of the predefined data elements using content-specific selection menus to generate revised data elements that are stored in the relational database;
   f) deconstruct syntax of textual data elements that are syntactically joined with linguistic rules, specify a category in which to place a business rule, generate one or more tasks associated with the business rule, and apply the business rule to the textual data elements of the customized document using the automatic text generator module;
   g) modify given data that is standard in particular data structures, and customize the given data for particular applications using the electronic library manager module;
   h) establish effectivity associations, using the effectivity interface module, for a given component of the product, and thereby define a manner in which a change to the given component is propagated throughout the customized document;
   i) in response to the user making the change to the given component via the effectivity interface module, propagate the change throughout the customized document according to the effectivity associations established by the user;
   j) synthesize at least one (i) text, (ii) graphics, and (iii) the revised data elements according to (i) the document definition defined by the document definition module, (ii) edits made by the user via the document editor module, (iii) the business rule applied by the user via the automatic text generator module, (iv) the customized data provided by the electronic library manager module, and (v) effectivity associations established via the effectivity interface module; and
   k) generate and publish the customized document.

19. The system of claim 18, wherein at least some of the predefined data elements have effectivity, and the processor tracks the predefined data elements having effectivity across multiple other customized documents to enable changes in the other customized documents.

20. The system of claim 18, wherein the processor generates the content-specific selection menus based on the document definition.

21. The system of claim 18, wherein the customized document is an extensible markup language document, and wherein the processor publishes the digital document by performing the steps of:
   forwarding the extensible markup language document to an extensible style sheet transform; and
   outputting the extensible markup language document from the extensible style sheet transform as a published document.

22. A storage medium containing instructions for publishing a customized document about a product, which when executed by a processor, causes the processor to perform operations comprising:
   a) providing a user with a document manager input interface on a computer, the input interface including a definition manager module, an electronic library manager module, an automatic text generator module, a document editor module, an effectivity interface module, and a document builder module;
   b) receiving a document definition based on a plurality of predefined data elements arranged in a tree-like data structure using the definition manager module, the predefined data elements being retrieved from a parts library contained in the document builder module, wherein the document definition comprises at least one of (i) a document structure for the customized document and (ii) page formatting information;
   c) creating the customized document from the document definition using the definition manager module;
   d) storing the customized document in a relational database;
   e) receiving data for one or more of the predefined data elements via content-specific selection menus to generate revised data elements that are stored in the relational database;
   f) deconstructing syntax of textual data elements that are syntactically joined with linguistic rules, specifiying a category in which to place a business rule, generating one or more tasks associated with the business rule, and applying the business rule to the textual data elements of the customized document using the automatic text generator module;
   g) modifying given data that is standard in particular data structures, and customizing the given data for particular applications using the electronic library manager module;
   h) establishing effectivity associations, using the effectivity interface module, for a given component of the product, and thereby defining a manner in which a change to the given component is propagated throughout the customized document;
   i) in response to the user making the change to the given component via the effectivity interface module, propagating the change throughout the customized document according to the effectivity associations established by the user;

j) synthesizing at least one (i) text, (ii) graphics, and (iii) the revised data elements according to (i) the document definition defined by the document definition module, (ii) edits made by the user via the document editor module, (iii) the business rule applied by the user via the automatic text generator module, (iv) the customized data provided by the electronic library manager module, and (v) effectivity associations established via the effectivity interface module; and k) generating and publishing the customized document.

23. The storage medium of claim 22, further comprising instructions which when executed by a processor, causes the processor to perform operations comprising:
providing tasks pre-associated with the predefined data elements.

24. The storage medium of claim 22, further comprising instructions which when executed by a processor, causes the processor to perform operations comprising:
cross-referencing the predefined data elements to one or more other documents.

25. The storage medium of claim 22, further comprising instructions which when executed by a processor, causes the processor to perform operations comprising:
dynamically generating the content-specific selection menus.

26. The storage medium of claim 22, wherein the digital document is in an extensible markup language file, and the medium further comprising instructions which when executed by a processor, causes the processor to perform operations comprising:
translating the customized document from the extensible markup language file to an output format selected using an extensible style sheet language transform.

* * * * *